United States Patent [19]

Gillum

[11] Patent Number: 4,958,879
[45] Date of Patent: Sep. 25, 1990

[54] AUTO SUN VISOR

[76] Inventor: Julius H. Gillum, 11668 Onyx St., Cypress, Calif. 90630

[21] Appl. No.: 253,732

[22] Filed: Oct. 5, 1988

[51] Int. Cl.⁵ .............................................. B60J 3/00
[52] U.S. Cl. .................................. 296/97.6; 296/97.8; 296/97.9; 160/370.2
[58] Field of Search ...................... 296/97.3, 97.6, 97.8, 296/97.1, 97.7, 97.9, 97.5; 160/DIG. 3, 370.2

[56] References Cited

U.S. PATENT DOCUMENTS

| | | | |
|---|---|---|---|
| 2,549,395 | 4/1951 | Short, Sr. .................... | 296/97.9 X |
| 2,620,222 | 12/1952 | Beauchamp ................... | 296/97.6 |
| 4,763,947 | 8/1988 | Gregg ........................ | 160/370.2 |
| 4,777,994 | 10/1988 | Nederueld .................... | 296/97.8 X |

Primary Examiner—Margaret A. Focarino
Assistant Examiner—Andrew C. Pike
Attorney, Agent, or Firm—Plante, Strauss, Vanderburgh & Connors

[57] ABSTRACT

Disclosed is a portable, compact sun visor adapted to be placed over the rearview mirror of an automotive vehicle. The visor comprises a generally rectangular member which is opaque and had dimensions which block sunlight from directly striking the driver in the eyes as the sun enters the windshield in the area surrounding the rear view mirror. The member is opaque and has a slot and hinge disposed along the central latitudinal axis of the member, enabling the member to be folded about the hinge and divided into two sections which are mirror images of each other. When unfolded and placed over the arm of the rearview mirror, the sun visor is balanced and blocks light entering the windshield in the vicinity of the rearview mirror.

4 Claims, 2 Drawing Sheets

U.S. Patent    Sep. 25, 1990    Sheet 2 of 2    4,958,879
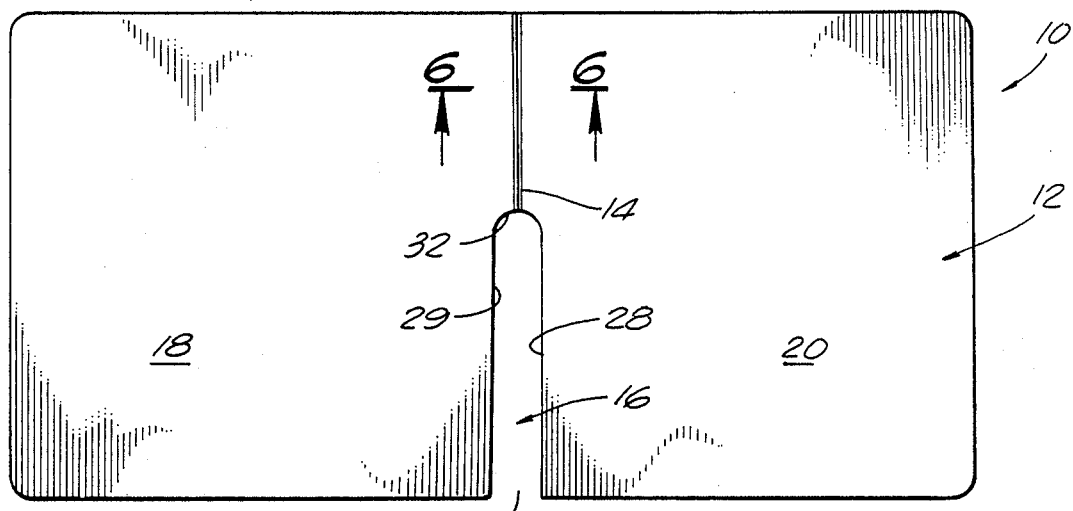
FIG. 3
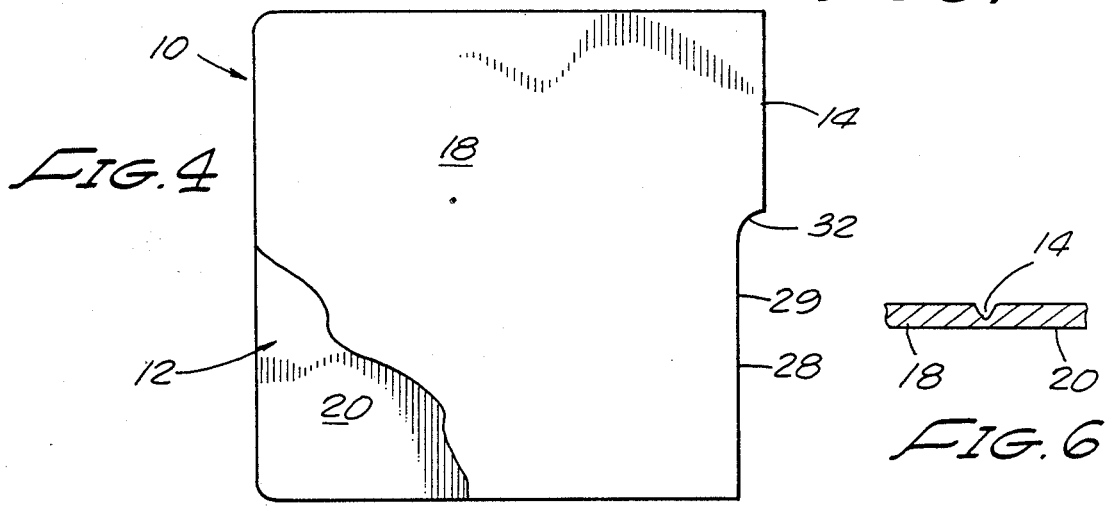
FIG. 4
FIG. 6
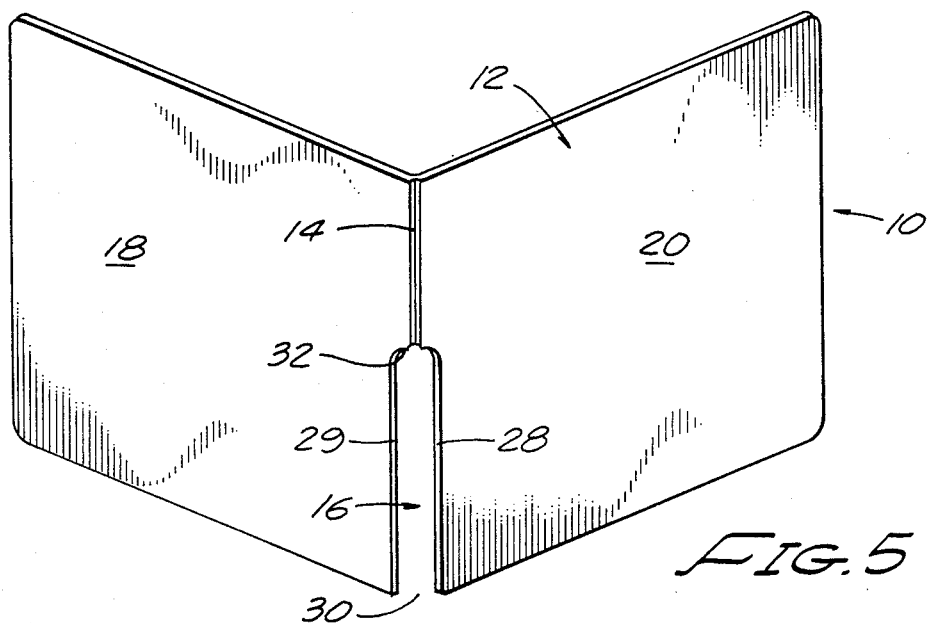
FIG. 5

AUTO SUN VISOR

BACKGROUND OF THE INVENTION

1. Field of the Invention:

This invention relates to a sun visor for an automobile, particularly, one which is compact, portable, and adapted to fit over the rearview mirror and block the sun's rays when the sun is low in the sky.

2. Background Discussion:

There are two periods of the day when the sun is low in the sky, at sunrise and sunset. This creates a very hazardous driving situation when driving directly into the sun. With the sun low in the sky, the light shines directly into the driver's eyes, blinding the driver. Most automobiles are equipped with sun visors that are tilted downwardly to block off the upper half of the windshield of the automobile. This substantially aids the driver, blocking most of the sun's rays. It is conventional, however, that the two sun visors terminate at the central section of the windshield where the rearview mirror is located. The windshield surrounding the rearview mirror is not blocked by conventional sun visors. With the sun low in the sky, the sun's rays will enter the windshield through this area surrounding the rearview mirror and blind the driver.

BRIEF DESCRIPTION OF THE INVENTION

The present invention provides a portable sun visor which is placed on the rearview mirror and blocks the sun entering the windshield through the area surrounding the rearview mirror.

The portable sun visor of this invention is adapted to be slipped over the arm connecting the rearview mirror to the automobile, either directly to the windshield or to some other portion of the automobile.

There are several features of this invention which contribute to the desirable attribute of blocking the sun from entering an otherwise unprotected portion of the windshield surrounding the rearview mirror. Without limiting the scope of the invention as expressed by the claims, its more prominent features will now be discussed briefly. After considering this discussion, and particularly after reading the section of this application entitled DETAILED DESCRIPTION OF THE PREFERRED EMBODIMENT, one will understand how the features of this invention provide the desirable attributes of safety, convenience, and low cost manufacture.

The first feature of this invention is the use of a body member that is of the correct dimensions to block the sun from entering the automobile in the vicinity of the rearview mirror. Preferably, the member has an essentially rectangular shape with a length ranging between about 12 and about 16 inches and a width ranging between about 6 and about 8 inches. This member is generally flat, rigid, thin, and has an opaque body which prevents light from passing through the member.

The second feature of this invention is that the body member has a hinge element that is centrally located. This hinge element divides the member into two sections which have the same general configuration but are mirror images of each other. Thus, the two sections will fold about the hinge and overly each other in registration.

The third feature of this invention is that the hinge lies along the central latitudinal axis of the body member and is generally straight, being formed by a fold along the central latitudinal axis of the member. Preferably, the member is made out of a cardboard material which has calendared surfaces on both sides and the hinge is formed by simply scoring the surface of the cardboard, cutting a slit which only partially severs the cardboard to allow the member to be folded inwardly about the hinge element.

The fourth feature of this invention is the use of an elongated slot in the body member which is also along the central latitudinal of the member. The slot has an open entry mouth along a longitudinal edge of the member. This slot extends from the mouth and terminates at a stop end within the body of the member. The one end of the hinge is immediately adjacent this stop end of the slot and the other end of the hinge is adjacent the opposed longitudinal edge of the body member. Two generally parallel side edges define the width and depth of the slot, extending from the open entry mouth to the stop end. The slot has a width ranging between about five eighths ($\frac{5}{8}$) and about seven eighths ($\frac{7}{8}$) of an inch and a length in excess of fifty per cent of the width of the member but less than seventy per cent of the width of the member.

The fifth feature of this invention is that the body member is adapted to be readily folded up so that it can be placed conveniently in a glove compartment or other suitable storage place in the automobile but is easily unfolded and placed on the mirror. This is accomplished by slipping the sun visor over the arm of the mirror so that it is between the back side of the mirror and the windshield. The user simply aligns the open entry mouth of the slot with the arm and slips the arm into the slot until the arm abuts the stop end of the slot in the body member. The two sections are spread open and straddle the arm of the rearview mirror, forming an opaque barrier between the windshield and the driver. Thus, the sun's rays cannot directly shine into the eyes of the driver through the area of the windshield surrounding the rearview mirror.

BRIEF DESCRIPTION OF THE DRAWING

The drawing, which is presented for illustrative purposes only, and in which like parts are indicated by like numerals, includes the following Figures:

FIG. 3 is a plan view of the sun visor of this invention in a fully open condition.

FIG. 4 is a plan view showing the sun visor of this invention in a fully closed position.

FIG. 5 is an end view of the sun visor of this invention in a partially open condition showing the hinge formed by scoring one surface of a calendared cardboard.

FIG. 6 is a cross-sectional view taken along line 6—6 of FIG. 3.

DESCRIPTION OF THE PREFERRED EMBODIMENT

Figure 1:
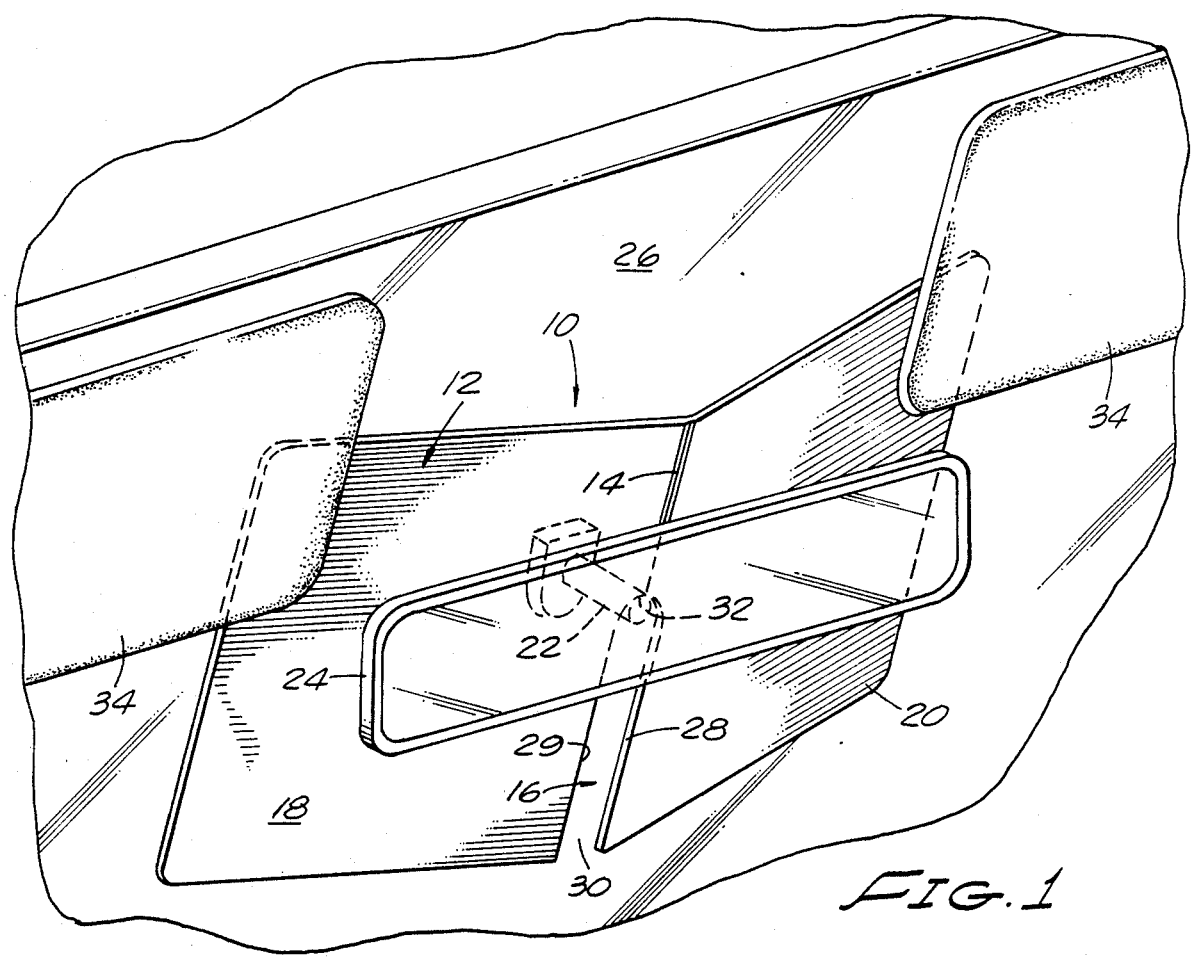
FIG. 1 is a perspective view of the sum visor of this invention placed on the rearview mirror of an automobile.
Figure 2:
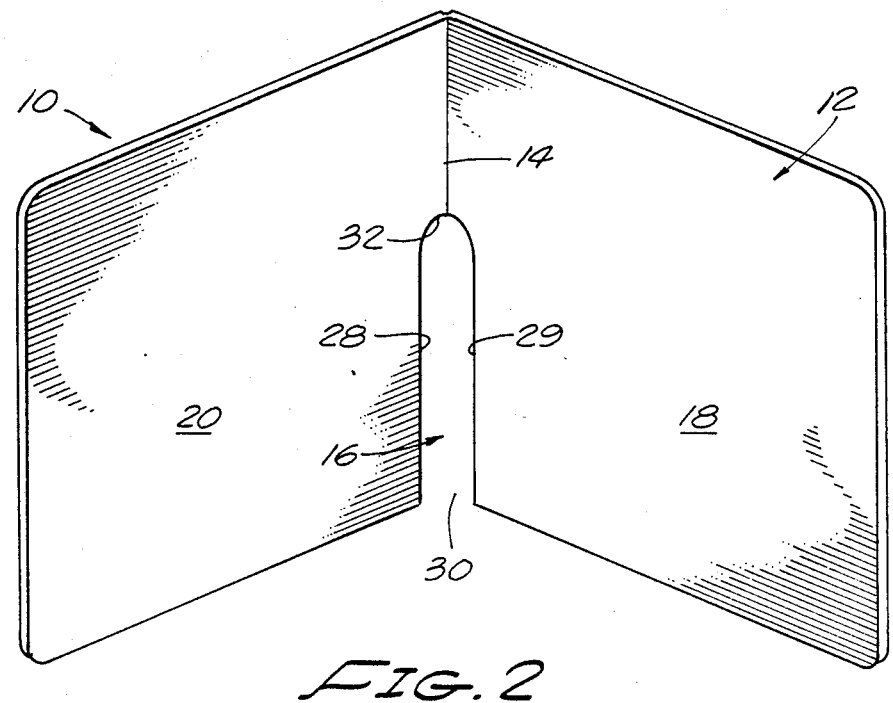
FIG. 2 is a perspective view of the sun visor of this invention in a partially open condition.

The sun visor 10 of this invention includes an essentially rectangular body member 12, as best illustrated in FIG. 3, which includes a hinge element 14 disposed lengthwise along the central latitudinal axis of the member and an elongated slot 16 which is aligned with the hinge element and also disposed along the latitudinal axis of the member. The latitudinal axis of the member 12 is coextensive with the longitudinal axis of the slot 16. Thus, the hinge element 14 and slot 16 are aligned with each other, dividing the member as viewed in FIG. 3 into a left hand section 18 and a right hand section 20 which are mirror images of one another. As illustrated in FIG. 4, when the two sections 18 and 20 are folded about the hinge element 14 they will form a compact structure with each section being in registration with the other section. This enables the sun visor 10 to be folded up and stored, for example, in the glove compartment or behind one of the conventional sun visors of the automobile.

The body member 12 has dimensions which when unfolded and placed over the arm 22 of the rearview mirror 24, as illustrated in FIG. 1, will block the area of the windshield 26 surrounding the rear view mirror so that the sun rays, when the sun is low in the sky, will not directly strike the eyes of the driver. Preferably, the width of the sun visor 10 is seven and one quarter (7¼)inches and the length is fourteen (14) inches. The slot 16 has a length of four and one half (4½) inches and a width of three quarters (¾) of an inch. The sides or edges 28 and 29 of the slot 16 are parallel with each other with the open entry end 30 of the slot being along the lower, longitudinal edge of the member 12, with the rear stop end 32 of the slot terminating in the body member, preferably in the form of a rounded bite intersected by the latitudinal axis of the member.

The body member 12 is made of any opaque material and preferably is thin, having a thickness of from about 0.06 to about 0.10 inch, is rigid, and is generally flat. A plastic material could be used, but preferably cardboard is the most desirable material because it is inexpensive and can be easily cut into the desired shape as illustrated in FIG. 3. Preferably one or both sides of the cardboard are calendared and have surfaces which readily accept printing. One of the calendared sides of the cardboard will be scored by cutting into the surface of the cardboard a slight way as illustrated in FIG. 6 to form the hinge element 14. This hinge element is essentially a straight line having one end terminating at the top longitudinal edge of the member 12 and the other end terminating at the stop end 32 of the slot 16. This is a very economical way of making the hinge element and permits the two sections 18 and 20 of the member to be folded and unfolded readily. When the hinge element 14 is made by scoring one side of the surface of the member 12, it will tend to fold inwardly in one direction but can be forced to fold over in the opposite direction although this is undesirable because it will tend to break the hinge element with repeated folding. Thus, by scoring the surface of the member 12 only on one side, the member tends to fold inwardly in one direction and not the other.

It is important that the slot 16 be sufficiently long and narrow so that the sun visor 10 be balanced when it is placed on the arm 22 of the rearview mirror 24. As illustrated in FIG. 1, the user simply unfolds the sun visor 10 of this invention and aligns the open entry end 30 of the slot 16 with the arm 22 of the rearview mirror 24 and slips the sun visor over the arm until the arm engages the stop end 32 of the slot. Since the width of the slot is relatively narrow and uniform along its entire length, it guides the body member 12 as the member is placed on the arm 22 of the rearview mirror 24. Preferably, the adjacent conventional sun visors 34 are folded downwardly to hold the sun visor 10 in position. The sun visor 10 of this invention, having the two sections 18 and 20 which are essentially identical in shape and weight, tends to balance itself on the arm 22 and the narrow dimension of the slot 16 is such that the sun visor does not tend to rotate a substantial amount.

SCOPE OF THE INVENTION

The above description presents the best mode contemplated of carrying out the present invention as depicted by the preferred embodiment disclosed. The combination of features illustrated by this embodiment provide its safety, convenience, and low cost of manufacture. This invention is, however, susceptible to modifications and alternate constructions from the embodiment shown in the drawing and described above. Consequently, it is not the intention to limit it to the particular embodiment disclosed. On the contrary, the intention is to cover all modifications and alternate constructions falling within the scope of the invention as generally expressed by the following claims.

I claim:

1. A portable sun visor adapted to be carried on an arm of a rearview mirror of an automotive vehicle, comprising an essentially rectangular member having a length ranging between about 12 and about 16 inches and a width ranging between about 6 and about 8 inches, said member having a generally flat, rigid, thin, and opaque body, with said member having a central latitudinal axis and opposed longitudinal edges, a hinge element formed in the member by folding the member about the central latitudinal axis of the member to divide said member into two sections which are mirror images of each other so that, upon folding the two sections about the hinge element, said sections are in registration with each other, and an elongated slot in the member lying along the central latitudinal axis of the member, with said slot having a longitudinal axis and said latitudinal axis being along the longitudinal axis of the slot, and said slot having at one end an entry mouth along one of the longitudinal edges of the member and terminating at another end in a stop end within the body of the member, said slot having a width ranging between about five eights and about seven eights of an inch and a length in excess of fifty percent of the width of the member but less than seventy percent of the width of the member to provide a third section between the other longitudinal edge and the stop end to enable the sun visor to be balanced when said sun visor is placed on the arm of the rearview mirror, with the third section above the arm and said stop end engaging the arm of the rearview mirror to support the body of the member when the member is placed on the arm.

2. The sun visor of claim 1 wherein the slot has parallel sides and the stop end is rounded to form a bite that is adjacent to an end of the hinge element.

3. The sun visor of claim 1 made of cardboard and the hinge element is formed by scoring one surface of the cardboard and folding the two sections inwardly opposite the side which is scored.

4. A method of partially covering a windshield of an automotive vehicle employing a rearview mirror connected by an arm to the vehicle, comprising placing on the arm of the mirror a sun visor, said sun visor comprising an essentially rectangular member having a length ranging between about 12 and about 16 inches and a width ranging between about 6 and about 8 inches, said member having a generally flat, rigid, thin, and opaque body, with said member having a central latitudinal axis and opposed longitudinal edges, a hinge element formed in the member by folding the member about the central latitudinal axis of the member to divide said member into two sections which are mirror images of each other so that, upon folding the two sections about the hinge element, said sections are in registration with each other, and an elongated slot in the member lying along the central latitudinal axis of the member, with said slot having a longitudinal axis and said latitudinal axis being along the longitudinal axis of the slot, and said slot having at one end an entry mouth along one of the longitudinal edges of the member and terminating at another end in a stop end within the body of the member, said slot having a width ranging between about five eights and about seven eights of an inch and a length in excess of fifty percent of the width of the member but less than seventy percent of the width of the member to provide a third section between the other longitudinal edge and the stop end to enable the sun visor to be balanced when said sun visor is placed on the arm of the rearview mirror, with the third section above the arm and said stop end engaging the arm of the rearview mirrior to support the body of the member when the member is placed on the arm, said sun visor being placed on the arm of the mirror by unfolding said sun visor and slipping the arm into the slot until the arm engages the stop end of the slot, with the two sections disposed on opposite sides of the mirror arm.

* * * * *